(12) United States Patent
Worthington et al.

(10) Patent No.: US 8,117,009 B1
(45) Date of Patent: Feb. 14, 2012

(54) DATA RECORDER FOR MUNITIONS

(75) Inventors: Marc Worthington, New Richmond, OH (US); Noah Desch, Cincinnati, OH (US); David Lawson, Cincinnati, OH (US); Scott Colegrove, Fairfield, OH (US)

(73) Assignee: L-3 Communications, Cincinnati, OH (US)

(*) Notice: Subject to any disclaimer, the term of this patent is extended or adjusted under 35 U.S.C. 154(b) by 867 days.

(21) Appl. No.: 12/221,549

(22) Filed: Jul. 30, 2008

(51) Int. Cl.
*G08B 21/00* (2006.01)

(52) U.S. Cl. ........ 702/187; 702/182; 702/185; 702/188; 340/870.17; 340/584; 340/632; 705/500; 73/12.01; 73/12.04; 73/504.14; 73/23.31; 73/23.2

(58) Field of Classification Search .......... 702/182, 702/185, 187, 188; 340/870.17, 584, 632; 705/500; 73/12.01, 12.04, 504.14, 23.31, 23.2

See application file for complete search history.

(56) References Cited

U.S. PATENT DOCUMENTS

| 7,194,889 B1 | 3/2007 | Jean et al. | |
| 2003/0058130 A1* | 3/2003 | Kramer et al. | 340/870.07 |

* cited by examiner

*Primary Examiner* — Sujoy Kundu
(74) *Attorney, Agent, or Firm* — Harness, Dickey & Pierce, P.L.C.

(57) ABSTRACT

Disclosed is a data recorder for munitions. The data recorder includes a power source, a processor, and an acceleration sensor. The data recorder further includes a trigger validation feature which is operably coupled to the data recorder to verify the occurrence of a secondary environmental/input event. This envisioned data recorder can contain a digital or analog device as a primary or secondary trigger. Data from an accelerometer is stored in FRAM memory.

20 Claims, 11 Drawing Sheets

DATA RECORDER FOR MUNITIONS

FIELD

The present disclosure relates to a data recorder for munitions and, more particularly, to a data recorder capable of withstanding in high deceleration forces during a munition impact event.

BACKGROUND

Figure 1:
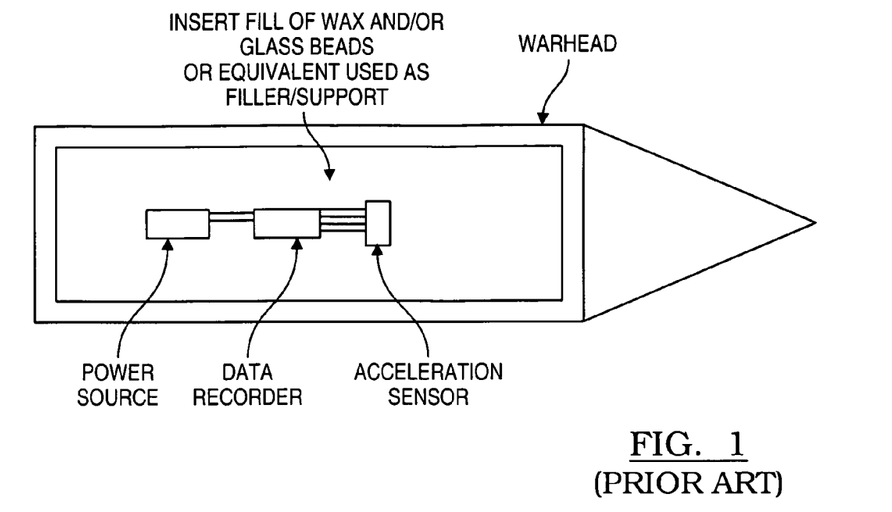
FIG. 1 represents a prior art munition and data recorder construction.

The statements in this section merely provide background information related to the present disclosure and may not constitute prior art. A method currently exists for recording acceleration and deceleration (analog) events and discrete electrical signals (digital) for various munitions. This method consists of assembling three main items. These items are the actual data recorder in the form of a processor, a power source, and an acceleration sensor or sensors. As seen in FIG. 1, all three of these components are typically electrically connected with wires.

Sometimes, the data recorder, power source, and acceleration sensor or combinations of these components are installed in a separate housing instead of "floating" inside an available cavity. In this case, the separate housing is typically filled with wax and/or glass beads or equivalent supporting media. In some cases, cabling/wires that extend outside of the test article are connected to some/all of the components for power and communication. In general, it is difficult to assemble the items discussed above due to the fact that these items are generally placed in a munition as an afterthought. Often, these assemblies are rather unsophisticated and use, for example, wooden dowels and tape have been used to assemble the battery, data recorder, and sensor together prior to placement into a warhead. Subsequent installation of the wax/glass beads, to increase the likelihood the assembly will survive, leads to significant room for error, i.e. insufficient fill leading to movement of components resulting in broken wires. Wax/glass beads are messy to work with and typically require clean up of the work area after initial installation. Disassembly of the items from the projectile is also challenging. Often wires will break during disassembly, possibly leading to component damage and, more importantly, the loss of test data stored in volatile memory.

In the prior art system discussed above, the data recorder starts to acquire and permanently store data after it has received an external signal. This signal can be caused, for example, by a circuit that is closed (or opened) after a munition is launched or impacts a surface. The circuit is typically closed (or opened) by way of an acceleration sensing switch composed of a mass, a spring and an electrical contact(s). When the acceleration becomes large enough, the mass overcomes the counteracting force from the spring thus closing (or opening) the circuit through the electrical contact(s).

Most current data recorders require power to be applied to the data recorder at all times during and after the event of interest. If power to the data recorder module is lost at any time, all the data is lost. This is due to what is known as "volatile memory" or memory that requires power to be maintained after it has been recorded. For current data recorders that use non volatile (EEPROM or flash based) memory, any loss in power during an impact event causes a complete loss of data. This occurs because the data is not actually permanently recorded onto the non-volatile memory until the end of the event. Memory write speeds prevents the "real time" recording of this data in EEPROM during an actual impact event. Additionally, current data recorders rely on only one trigger event to start the recording sequence. This means that a false/premature trigger event can lead to capturing erroneous data.

As such, the current data recording prior art systems offer the following disadvantages: 1) Items are placed in a munition as an "after thought" causing improperly supported assemblies leading to an increased risk of broken wires and data recorder component damage; 2) Difficulty installing and controlling the supporting fill, leading to possible movement of components, thus leading to broken components/wires; 3) Failure of the external power source, i.e. a broken battery leads during an impact event lead to partial or total loss of data; 4) Disassembly can cause components to be damaged, power to be lost, and requires clean up due to wax/glass beads; 5) Momentary/permanent loss of power for volatile memory and EEPROM/Flash non volatile memory to the data recorder (i.e. broken power wire, damaged battery etc.) can lead to total loss of data; and 6) A premature trigger event can lead to incorrect data being permanently recorded.

It is an object of the present teachings to provide a data recording assembly for munitions that integrates the power source, data recorder, and sensors in a package that overcomes at least one of these problems above. Additionally this data recorder contains features that are intended to increase the probability that as much data as possible will be recovered after an impact event. These features and a general description of the device are discussed below.

SUMMARY

This section provides a general summary of the disclosure, and is not a comprehensive disclosure of its full scope or all of its features.

Disclosed is a data recorder for munitions. The data recorder includes a power source, a processor, and an acceleration sensor. The data recorder further includes a trigger verification module or validation feature which is operably coupled to the data recorder to verify the occurrence of a secondary environmental/input event. This envisioned data recorder can contain a digital or analog device as a primary or secondary trigger.

In another embodiment, the data recorder utilizes a power supply, an accelerometer sensor, and a processor. Associated with the processor is a ferroelectric or FRAM memory, which is used to record signals indicative of measurements from the acceleration sensor. The acceleration data is stored within the FRAM in real time.

In another embodiment of the invention, a data recorder for munitions is provided which utilizes an internal power system. The internal power system has a secondary power supply in the form of a bank of capacitors which are directly coupled to the processor and sensors and are utilized during an impact event should power from the intended power source be interrupted during a deceleration event.

In another embodiment, a data recorder system for recording the deceleration of a munition is disclosed. The munition has a primary deceleration axis. The system has a plurality of electrical connections between power, control, and sensor modules. At least one of the electrical connections have pin and socket interfaces where the pin and socket are generally parallel to the primary deceleration axis.

In another embodiment, the munitions data recorder is provided having a power module, a processor, and a first accelerometer module. Disposed between the accelerometer module and its sensors are a plurality of pin and socket interfaces. The pin interface between the sensor and the accelerometer module is generally disposed along a primary deceleration axis.

DRAWINGS

The drawings described herein are for illustration purposes only of selected embodiments and not all possible implementations, and are not intended to limit the scope of the present invention.

Corresponding reference numerals indicate corresponding parts throughout the several views of the drawings.

DETAILED DESCRIPTION

The following description is merely exemplary in nature and is not intended to limit the present disclosure, application, or uses. It should be understood that throughout the drawings, corresponding reference numerals indicate like or corresponding parts and features.

Generally, the munitions data recorder 20 and associated components shown in FIGS. 4-17, are designed specifically to survive a munition's impact or launch in a particular orientation. The teaching herein, however, can be applied to data recording in munitions having any orientation. The munition data recorder 20 is generally formed of a sensor module 22, data recorder module 24, and power supply 26.

Figure 2:
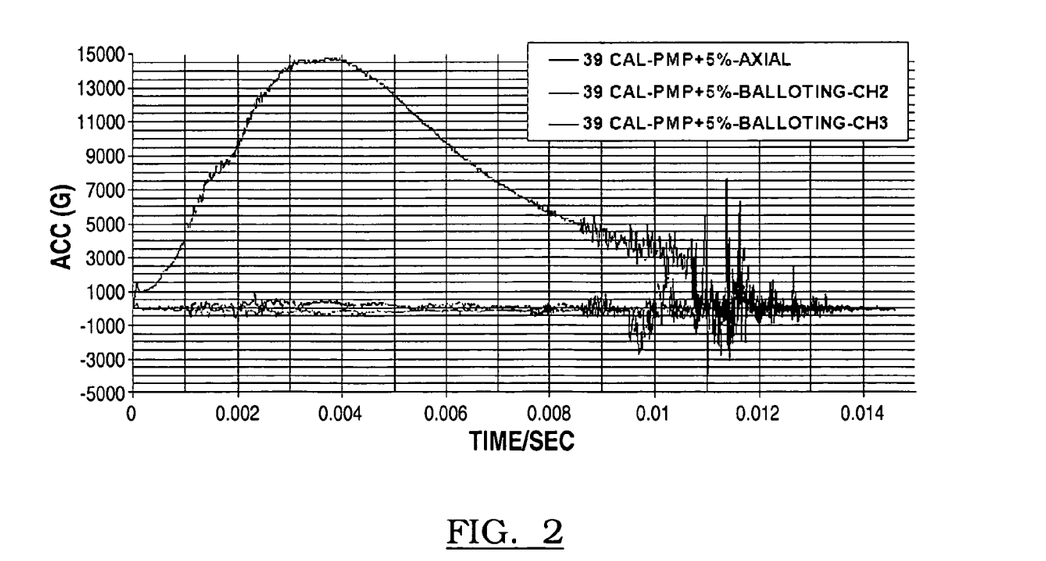
FIG. 2 represents the deceleration curve for a munition impact having a launch impact event.
Figure 3:
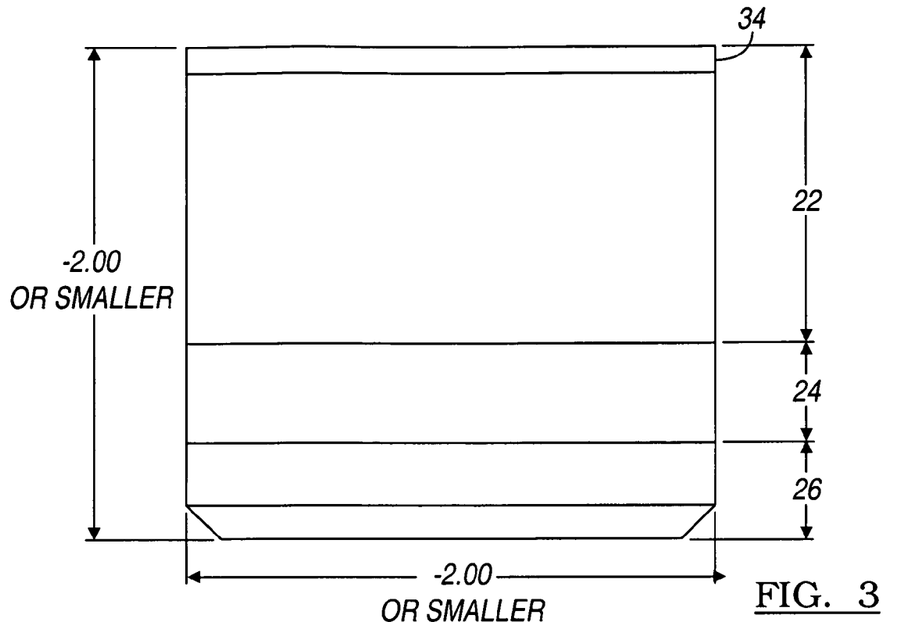
FIG. 3 represents an exterior view of the data recorder according to the present teachings.
Figure 4:
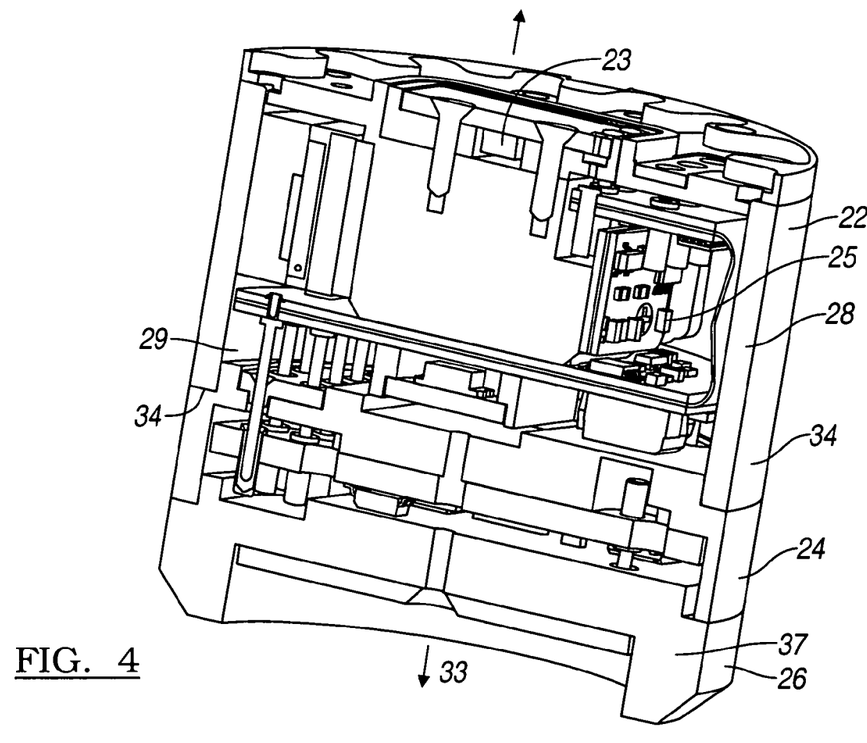
FIG. 4 represents a cross-sectional view of the data recorder shown in FIG. 3.
Figure 5:
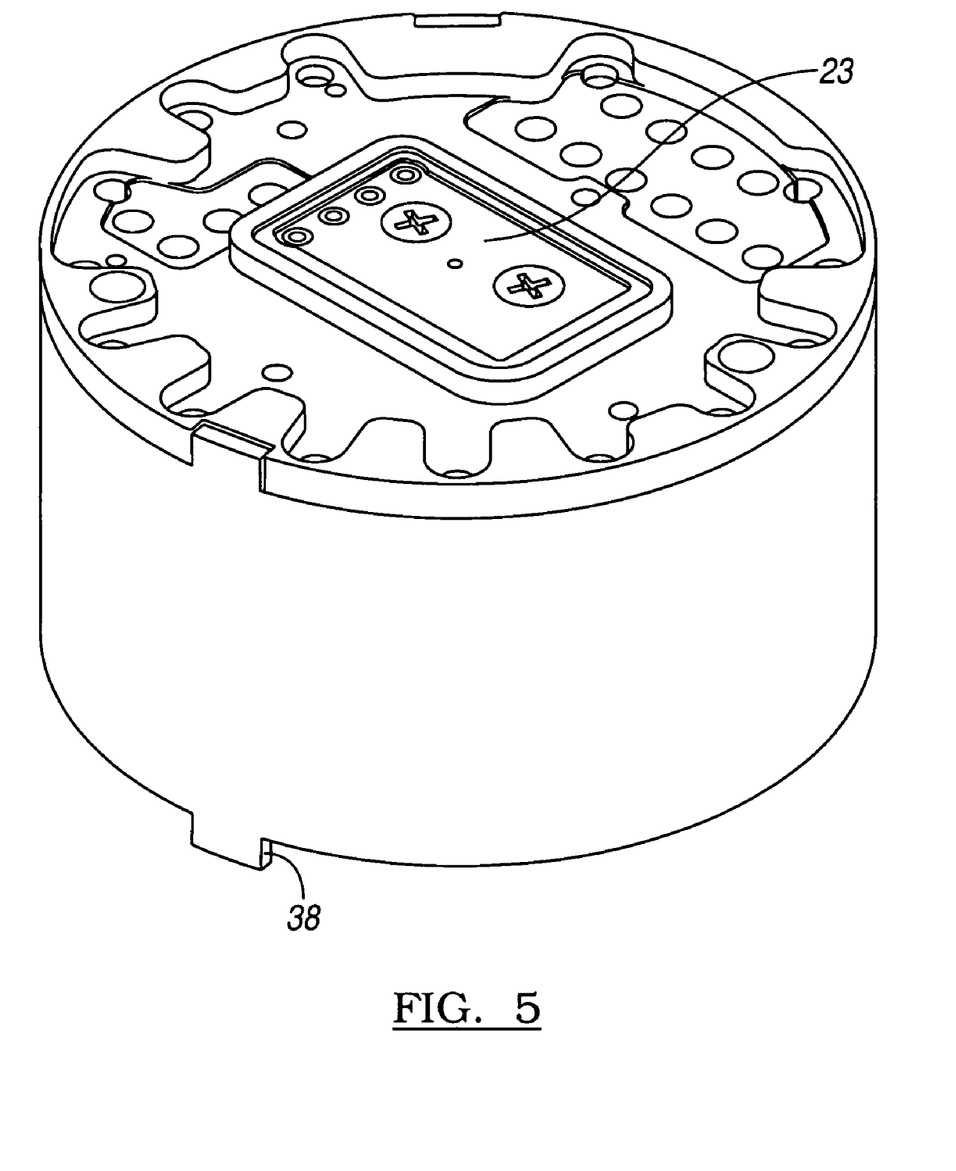
FIGS. 5 and 6 represent top and bottom views of the sensor module shown in FIG. 3.
Figure 6:
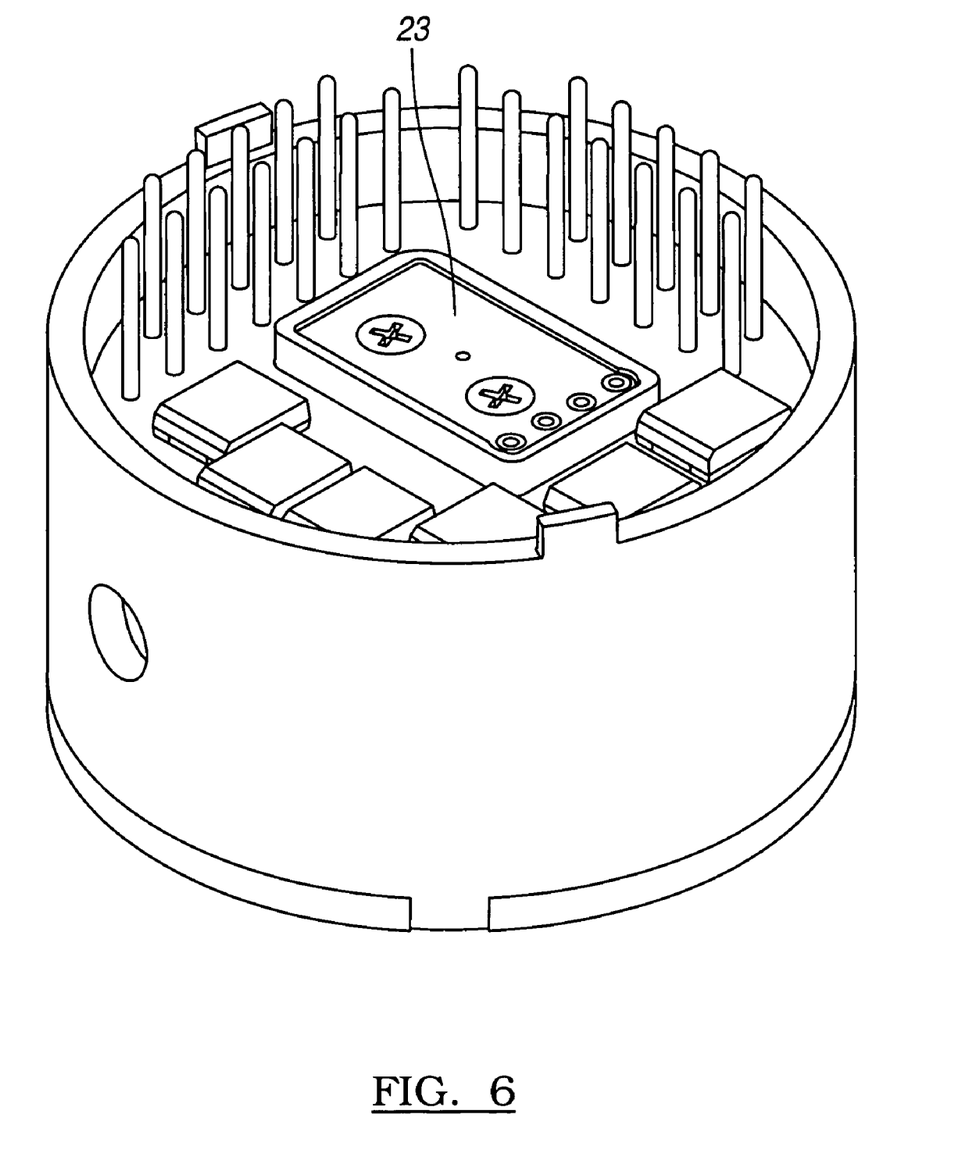

FIG. 2 represents tri-axial data readout from a munitions launch. As can be seen, one data channel exhibits significantly higher acceleration than the other channels. This higher acceleration represents acceleration along the primary acceleration axis 33 during an impact event.

As shown in FIGS. 5-9, the sensor module 22 is responsible for housing the accelerometer(s) 23 and associated signal conditioning circuitry 25. Optionally, this module holds four accelerometers 23 (two axial and two lateral). The sensor module 22, however, is not limited to this configuration, but it can be configured as desired to hold any number of accelerometers 23 in any desired orientation. The other configurations may not have the benefits described below.

Figure 7:
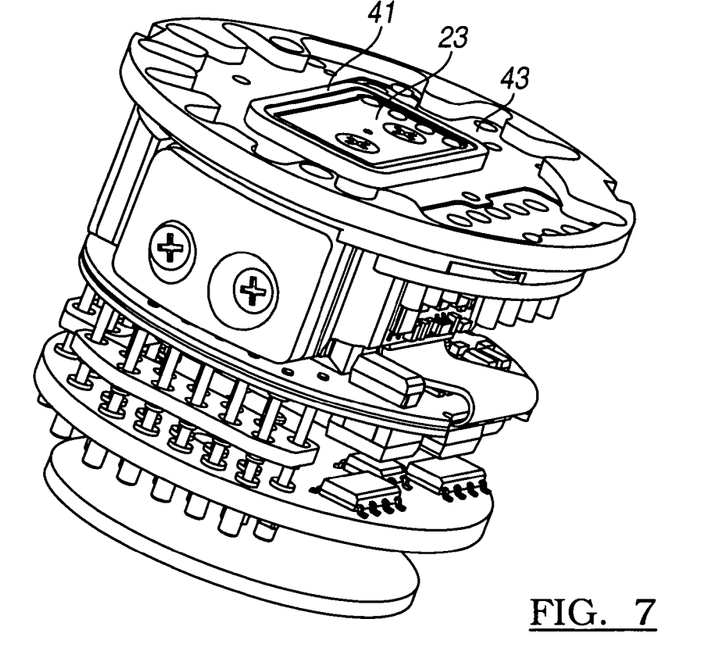
FIG. 7 represents an interface of the modules.
Figure 8:
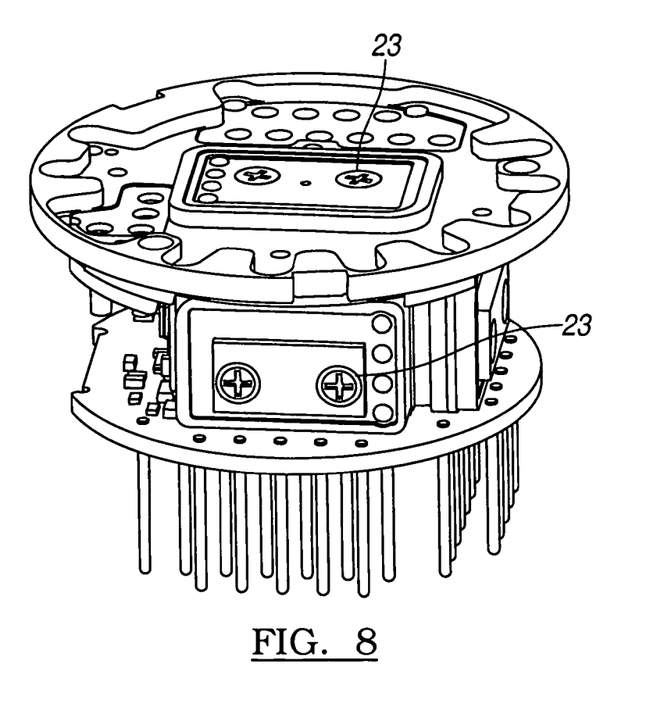
FIGS. 8 and 9 represent perspective views of the sensor module with its casing removed.
Figure 9:
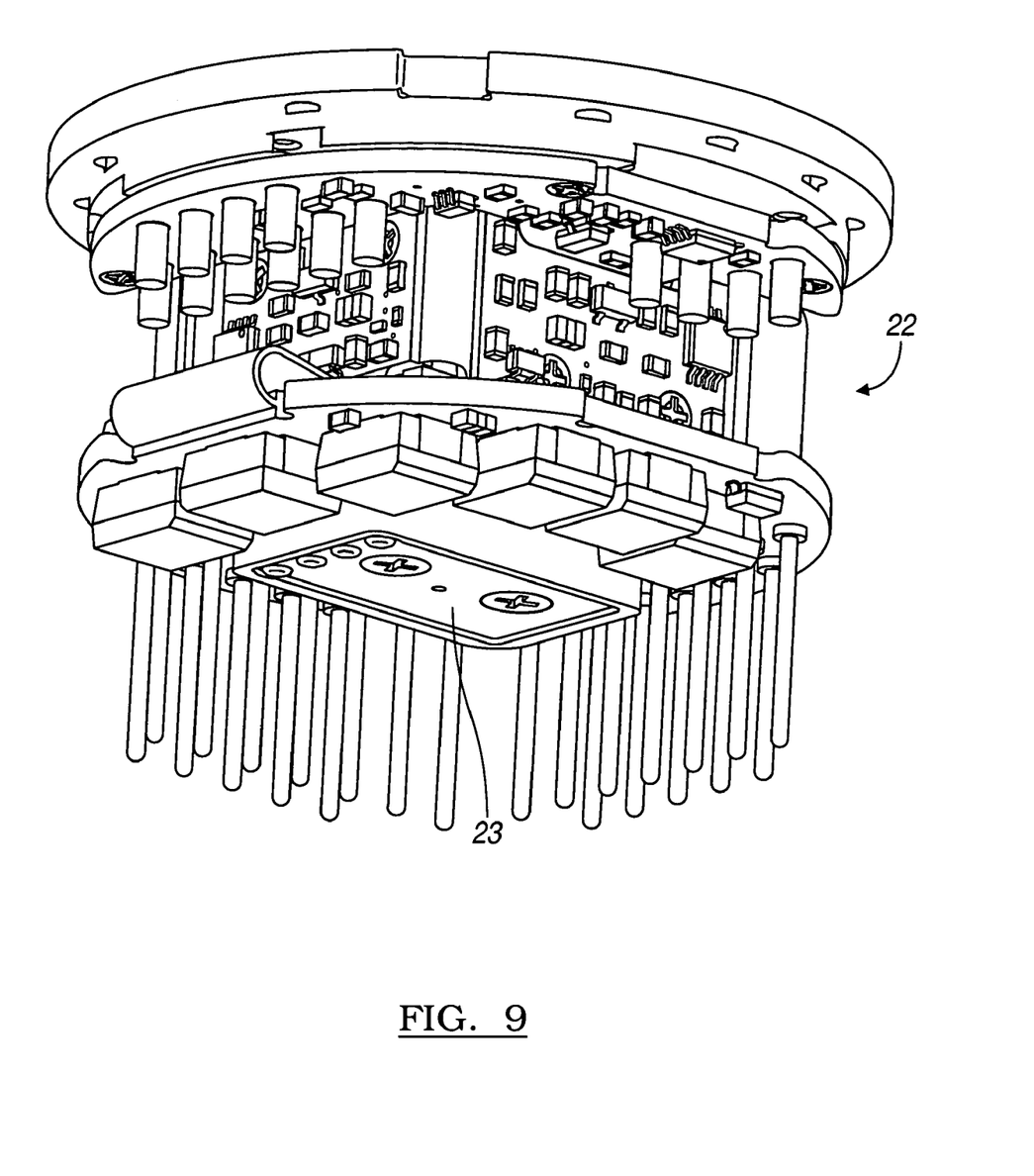

FIG. 7 represents the coupling of the sensor module 22 with the data recording module 24. Shown is the use of interface pins and sockets which are generally parallel to the primary deceleration axis. This interface can be a Mill-Max receptacle, part number 0351-0, and the pins are based on Mill-Max part number 3124. Optionally, additional accelerometer modules can be coupled to the sensor module at an axis generally perpendicular to the primary deceleration axis. This interface allows the selective attachment of a plurality of different accelerometers to the processor.

The sensor module 22 contains power conditioning circuitry 25 that provides the power to the entire data recorder. It additionally can contain a bank of capacitors, or batteries, that will act as a secondary source of power for the module for up to ~75 ms if power from the power source module 26 is lost. The sensor module 22 also is responsible for passing electrical signals from the external interface to data recorder module 24 and power to the power supply module 26 through appropriate pin/socket interfaces 29.

Figure 10:
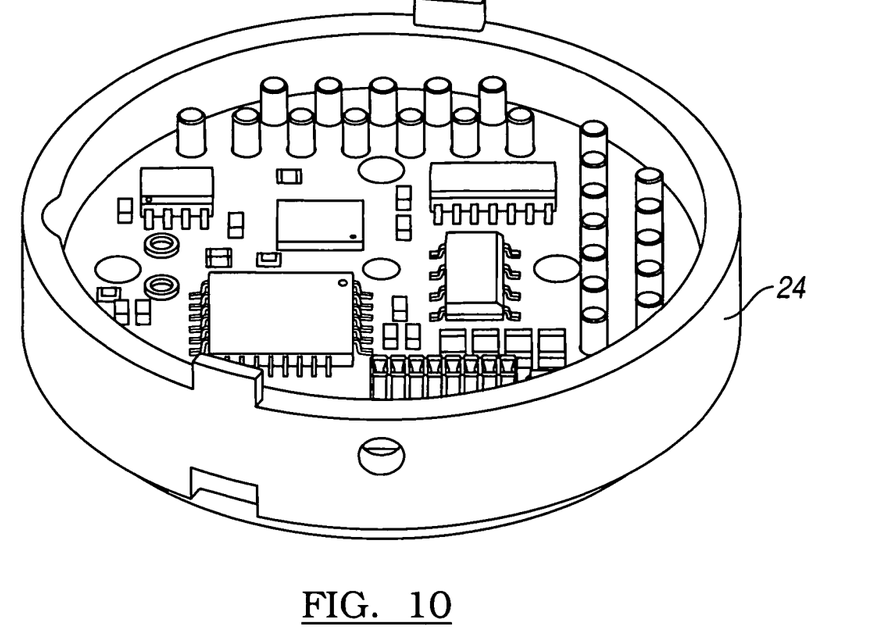
FIGS. 10 and 11 represent top and bottom perspective views of the data recorder module shown in FIG. 3.
Figure 11:
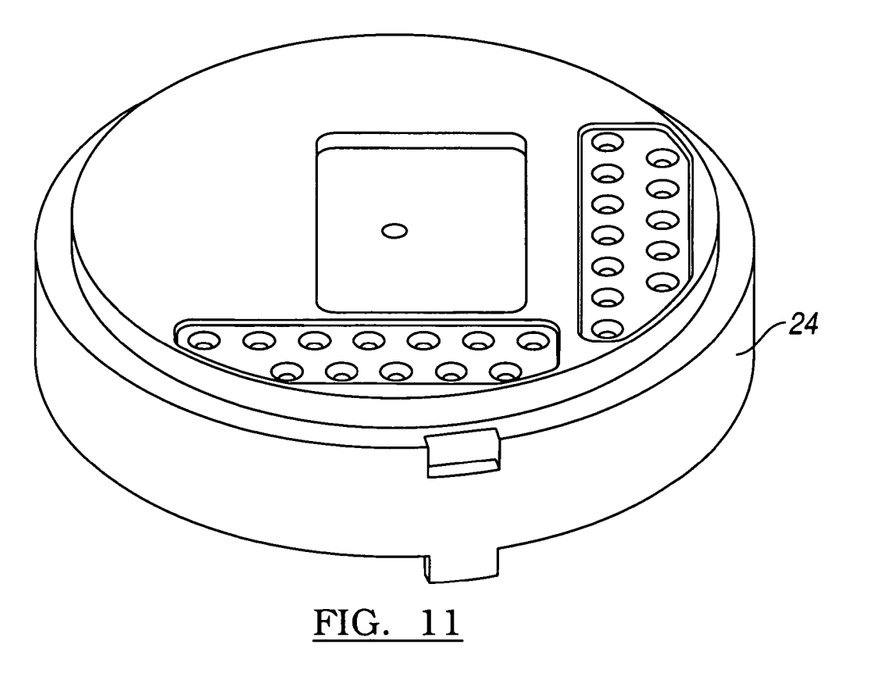

As shown in FIGS. 10 and 11, the data recorder module 24 which is electrically and physically coupled to the sensor module 22, is responsible for processing and storing analog and digital data acquired from the accelerometers 23 and other pre-defined inputs. Optionally, the data recorder module 24 accepts four analog and five digital inputs and one digital output, but has the capability for expansion. Additionally, two independent secondary triggers are also available through the digital inputs (not shown).

Upon application of power to the recorder module 24, following configuration, the recorder module 24 begins recording pre-event data and awaiting a trigger signal from an accelerometer 23 and/or from at least one independent trigger defined by the configuration settings. While awaiting a trigger signal, the data can be stored in a continuous "first in first out" FIFO loop within memory using the memory size defined by the configuration settings. The receipt of a trigger signal serves as a marker which shows the halting of the recording of pre-event data and begins recording data contiguously until the end of memory or exhaustion of available power. Care is taken not to overwrite data of an impact event by the FIFO loop in memory.

It is envisioned the data recorder module 22 can utilize ferroelectric random access memory (FRAM or FeRAM). The use of FRAM allows the data recorder module to store incoming data in non-volatile memory immediately at bus speed without delayed writes to non-volatile memory. This allows the recording of the data in "real time" during a munitions impact or acceleration event. This FRAM is coupled to the accelerometer(s) through the processor. As previously mentioned, RAM memory requires sustained power even following the recording event in order to retrieve data. FLASH EEPROM memory involves long write cycles in reference to an event. Therefore, all data must exist in volatile memory (RAM) until post-event processing and transfer can occur. As such, it is envisioned that the sensor module 22 can be disassembled after an impact event and the data recorder module 24 or FRAM from the data recorder module can be individually accessed to access the data from an impact event. In the event the recorder is undamaged, the data can also be retrieved from the intact module 20.

Figure 12:
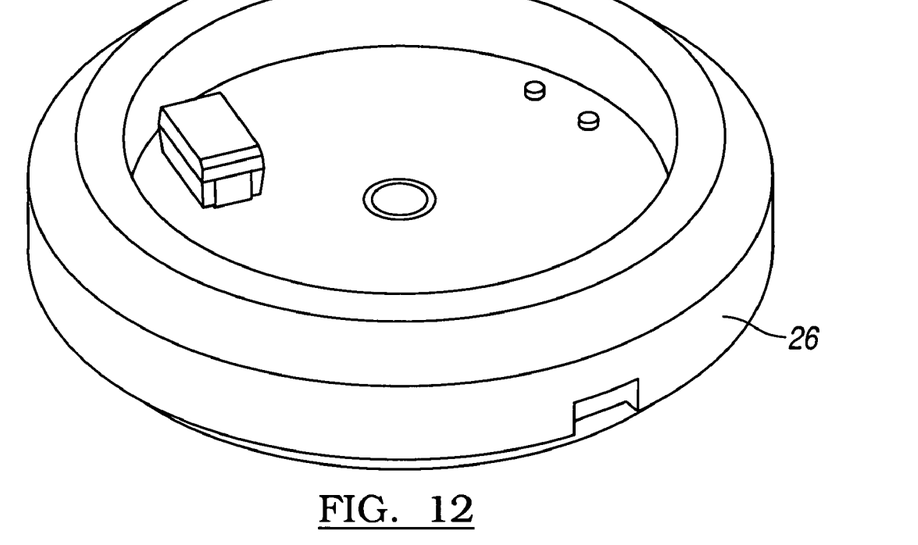
FIGS. 12 and 13 represent top and bottom perspective views of the power source shown in FIG. 3.
Figure 13:
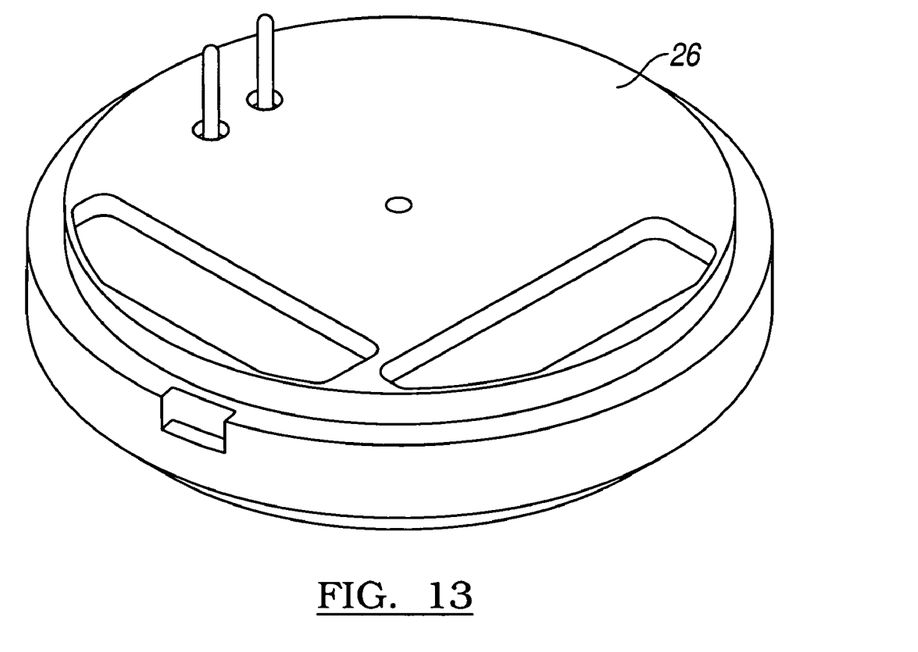

As shown in FIGS. 12 and 13, the power supply module 26 is the primary source of power for the data recorder module 24. It is envisioned a bank of capacitors or a battery can be used to power the system. As mentioned earlier, a secondary or subset of the capacitor battery bank 32 can be found in the sensor module 22, thereby providing power back-up. The two power sources 32 are combined through diodes and are charged by a power source external to the data recorder to either prior to or after installation of the data recorder 20 into the munition. This external power source is typically cut at some point during the test event.

The modules 22, 24, 26 are attached electrically by way of pins and receptacles. The pins and receptacles are generally parallel to a primary deceleration axis 33 (see FIG. 2). This configuration eliminates the wires that often break during testing. Returning briefly to FIGS. 4 and 5, mechanical locating features 38 formed on the external housing 34 help ensure correct alignment as well as preventing relative rotation of the housings. This relative rotation can be the source of failure in electrical connections. In this example, the modules 22, 24, 26 can be held together axially inasmuch as the module 20 is under compression as part of an assembly in the projectile. The exterior housing 34 of one module can seat within an external groove 37 defined within an adjacent housing. However, fasteners, epoxy, welding etc. can be used to hold the modules 22, 24, and 26 together if required.

Figure 14:
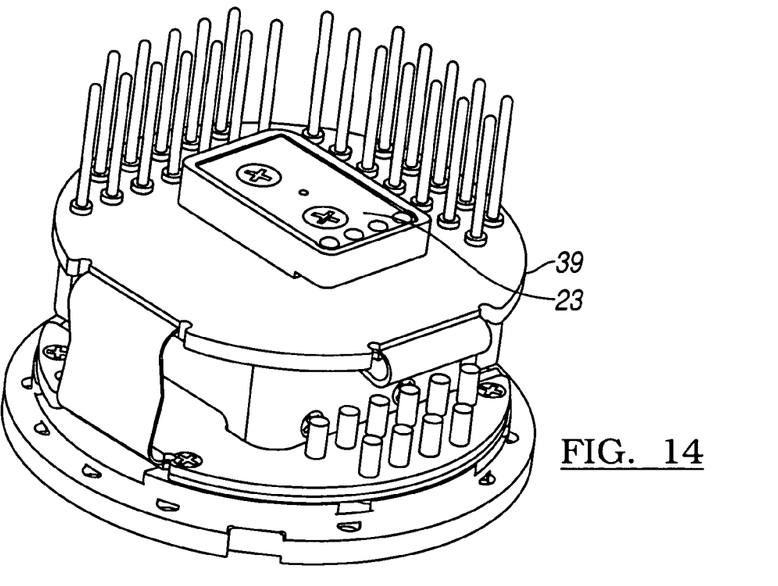
FIG. 14 represents an accelerometer module plugged into a sensor module circuit.

As best seen in FIG. 14, the accelerometers are electrically connected to the sensor module 22 using a similar pin socket configuration. The example shown in FIG. 14 shows one method for interfacing with a specific type of accelerometer package with the sensor module 22. The sensor module 22 has been designed such that it can interface with other accelerometer packages. Optionally, an accelerometer 23 can be mounted in a configuration which allows the accelerometer module 23 to bear against a bearing surface 39 which is perpendicular to the impact axis. FIG. 7 shows how an accelerometer package 23 is mounted into an aperture 41 defined in a bearing surface 39 by walls 43 which define the aperture. The sensor assembly is supported axially and radially.

Figure 15A:
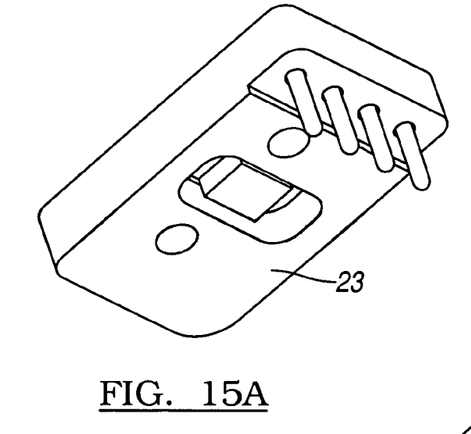
FIGS. 15a-15c represent perspective views of an accelerometer module using a surface mount accelerometer.
Figure 15B:
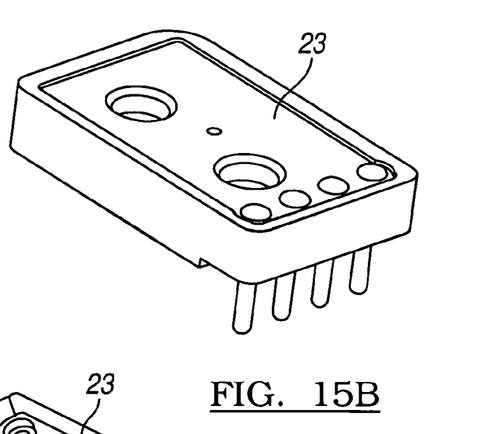
Figure 15C:
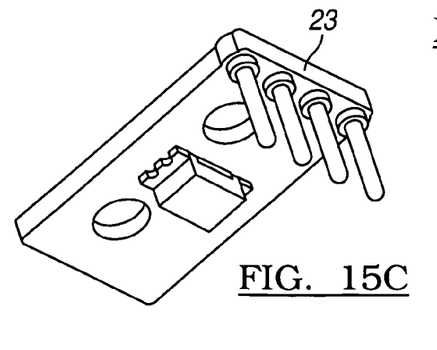
Figures 15D, 16A, 16B:
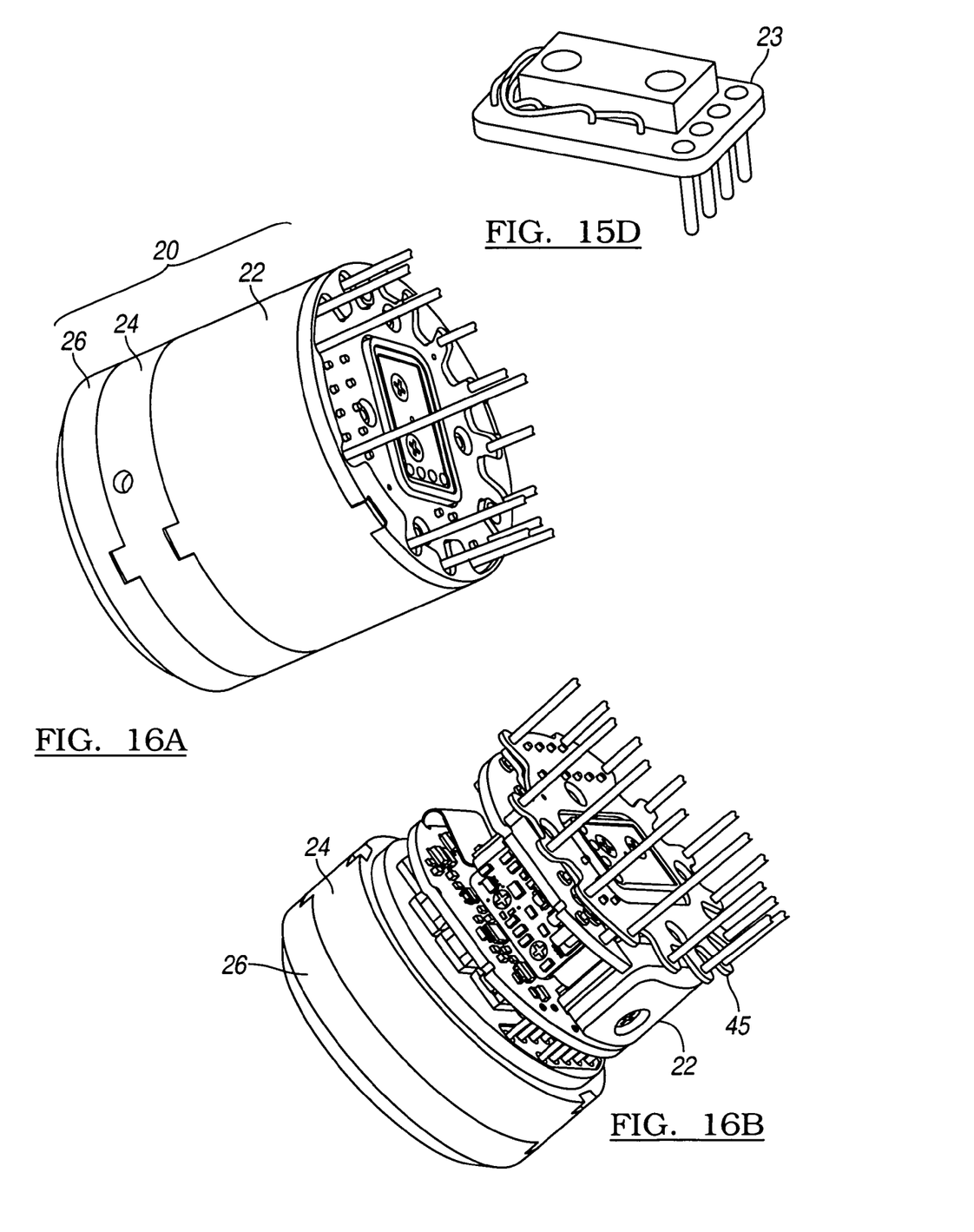
FIG. 15d shows an accelerometer module using an accelerometer that has wire leads.
FIG. 16a-16b represent perspective views of the interface wiring between the module and exterior systems.
Figure 17:
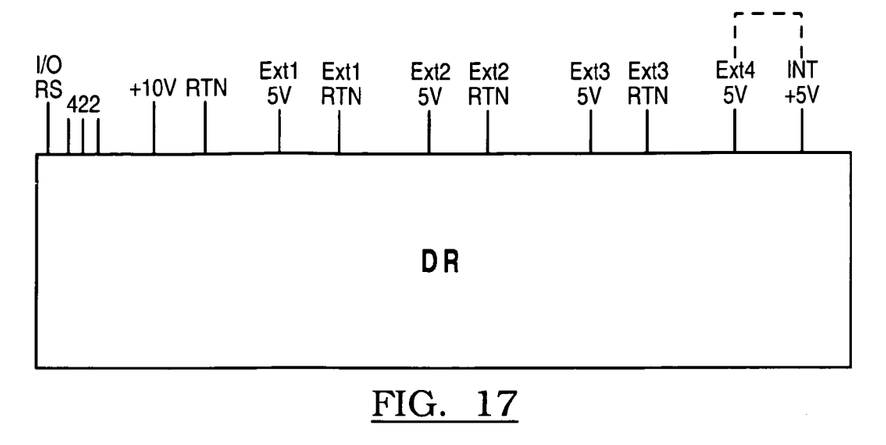
FIG. 17 represents a diagram of an interface connection of the data acquisition module, the data recorder; the external power source and the communications input/output.

As seen in FIGS. 16a-17, the external interface in this configuration is provided by a circuit board 45 that has pins that plug into receptacles inside the sensor module 22. Wires are soldered to this board to make connections between the sensor module 22 and outside stimuli, and for power and communications.

Using this configuration allows for fast electrical connection of the data recorder with external sources. If wires that connect to the circuit board are severed they can be easily replaced allowing the circuit board assembly to be reused. This interface could also occur using a connector or other standard electrical connection technique.

As seen in FIG. 17, there are three main sections to the electrical interface. Shown is the RS 422 interface with the data recorder used to upload/download test configurations and data. This configuration is not limited to RS 422, as other communication configurations can be used. Next to the RS 422 is the power input and return. The remaining section is for digital signal monitoring. In this configuration, up to four digital signals can be monitored (more signals can be monitored if required). The first three signals require their own power and reference (ground). The last signal (Ext4) is driven by a +5V output from the data recorder. This signal can be used to monitor events that do not have there own power source. The +5V output can also be used to drive Ext1 through Ext3 in some circumstances.

Figure 18:
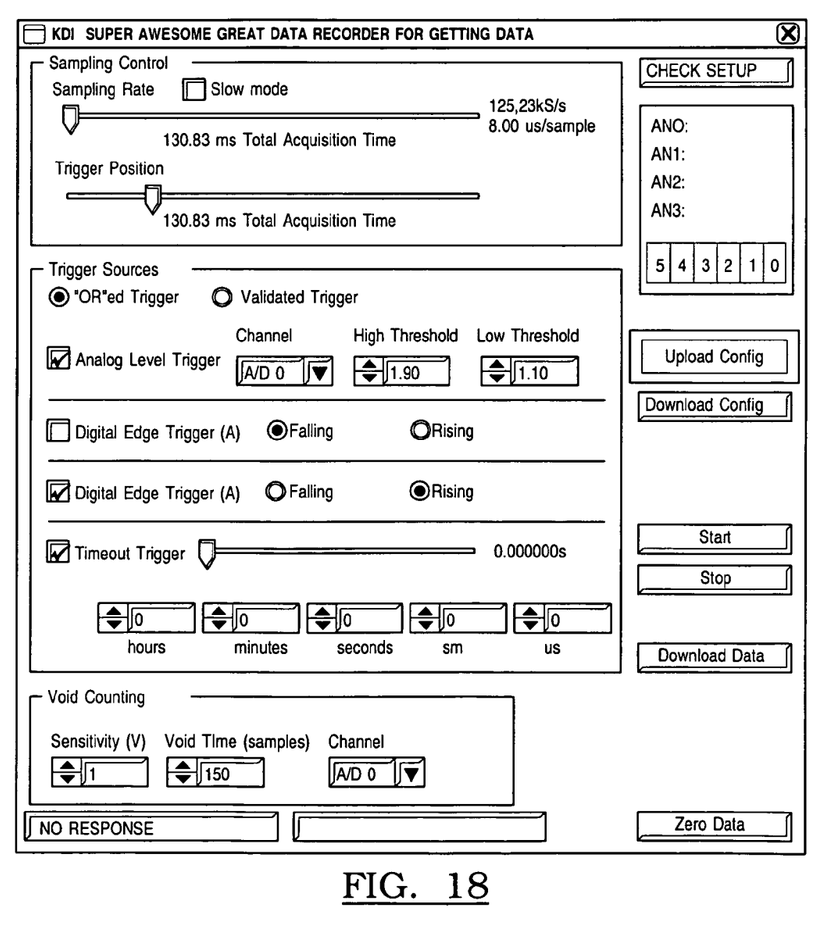
FIG. 18 represents a graphical user interface (GUI) to program the data recorder shown in FIG. 3.

As seen in FIG. 18, Graphical User Interface (GUI) can be used to communicate to the data recorder module 20 via serial communication (i.e. RS-422). This allows the user to specify the percentage of pre-event (pre-trigger) data, record time, trigger inputs etc. The design of this recorder allows for analog triggers in addition to digital triggers. The user specifies the configuration using the GUI and then downloads it to the data recorder module 24, via the sensor module 22.

During the use of the data recorder, false triggers are typically a concern when installing a projectile with a data recorder into the launch vehicle, i.e. a Howitzer, sled track, aircraft, and air gun. For example, a false trigger could be caused by excessive rattling while positioning a projectile in a Howitzer. This false trigger could prematurely trigger the data recorder thereby causing the data recorder to complete its acquisition before the projectile is fired. To alleviate the effect of a false trigger, the data recorder is optionally equipped with a trigger validation feature. The validation is based on verification of an additional trigger input after the primary trigger input has been received. If the verification trigger was found inactive at the completion of the data recorder's acquisition, then the recorder assumes the previous trigger was invalid and resets back into the pre-trigger mode and, thus, continues to store data in the FIFO mode. An example of a trigger validation event is the external power source being eliminated after the power source wires are cut when the Howitzer is fired. Additionally, sensors can be used to detect munitions spin or lack thereof.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A munition mounted data recorder comprising:
   a power source;
   a processor coupled to the power source;
   an accelerometer coupled to the processor;
   a trigger verification module which is operably coupled to the data processor to verify the occurrence of a secondary input event after an impact event, wherein the power source, processor, accelerometer and trigger verification module is disposed within the munition.

2. The data recorder according to claim 1 wherein the trigger verification module is configured to monitor one of a digital or an analog signal.

3. The data recorder according to claim 1 further comprising FRAM operably coupled to the processor, said FRAM is configured to record signals indicative of measurements from the accelerometer.

4. The data recorder according to claim 3 wherein the acceleration data is stored within the FRAM during the impact event.

5. The data recorder according to claim 1 wherein the power source comprises a secondary power supply directly coupled to the processor and the accelerometer.

6. The data recorder according to claim 1 further comprising a plurality of accelerometers.

7. A munition mounted data recorder for recording a deceleration signal during a munitions acceleration impact event, the data recorder comprising:
   a power supply;
   an accelerometer;
   a processor coupled to the accelerometer; and FRAM, which is configured to record signals indicative of measurements from the accelerometer, wherein the power supply, processor, FRAM and accelerator are disposed within the munition.

8. The data recorder according to claim 7 wherein the acceleration data is stored within the FRAM during the munitions impact event.

9. The data recorder according to claim 7 wherein the FRAM is couple to the accelerometer through the processor.

10. The data recorder according to claim 7 further comprising a plurality of accelerometers operably coupled to the FRAM through the processor.

11. A munition mounted data recorder for measuring deceleration in a munitions during an impact event comprising:
an accelerometer;
a processor;
an internal power system having primary and secondary power supplies, said secondary power supply being directly coupled to the processor and accelerometer, wherein said accelerometer, processor and internal power supply are disposed within the munition.

12. The data recorder according to claim 11 wherein the secondary power supply is initiated during an impact event should power from the primary power source be interrupted during the impact event.

13. The data recorder according to claim 11 wherein the secondary power supply is a bank of capacitors.

14. The data recorder according to claim 11 wherein primary and secondary power supplies supply enough energy to prevent the need for external power during an impact event.

15. A munition mounted data recorder for recording the deceleration of a munitions during an impact event, the munitions having a primary deceleration axis, said data recorder comprising:
an accelerometer module;
a processor operably coupled to the accelerometer module;
an internal power system operably coupled to the processor;
a plurality of electrical connections between at least two of the accelerometer module, the processor and internal power system, wherein at least one of the electrical connections has a pin and socket interface, where the pin and socket are generally parallel to the primary deceleration axis, and wherein the accelerometer module, processor and internal power system are disposed within the munition.

16. The data recorder according to claim 15 wherein the accelerometer module comprises at least one of a pin and a socket aligned with the primary deceleration axis.

17. The data recorder according to claim 15 wherein the accelerometer module is coupled to a bearing surface, said bearing surface being generally perpendicular to the primary deceleration axis.

18. The data recorder according to claim 15 further comprising an interface which allows the selective attachment of a plurality of accelerometers to the processor.

19. A munition mounted data recorder for recording the deceleration of a munitions having a primary deceleration axis, said data recorder comprising:
a power module;
a processor disposed within the munition;
a first accelerometer module disposed within the munition, said first accelerometer module having an accelerometer, disposed between the acceleration module and the accelerometer are a plurality of pin and socket interfaces, wherein the pin interface is generally disposed along the primary deceleration axis.

20. The data recorder according to claim 19 further comprising a second accelerometer module having a second accelerometer, disposed between the second acceleration module and the second accelerometer are a plurality of pin and socket interfaces, wherein the pin interface is generally disposed perpendicular to the primary deceleration axis.

\* \* \* \* \*